United States Patent Office 3,179,950
Patented Apr. 20, 1965

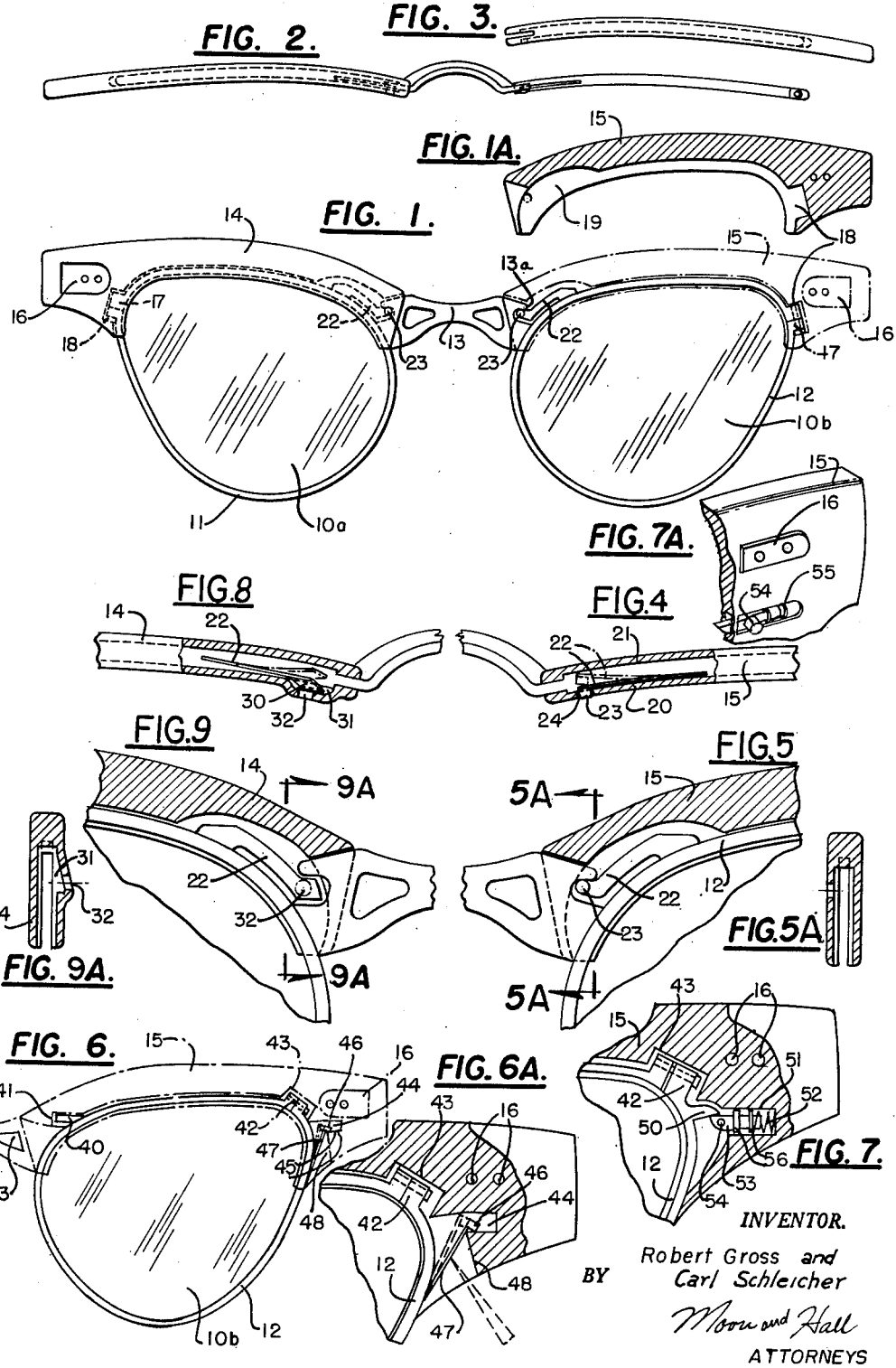

3,179,950
SPECTACLE FRAME WITH DETACHABLE
ORNAMENTAL BROW-BARS
Robert Gross, 21 Coolidge Place, Hackensack, N.J., and
Carl Schleicher, 309 W. 55th St., New York, N.Y.
Filed Sept. 14, 1959, Ser. No. 839,821
8 Claims. (Cl. 351—52)

This invention relates to spectacles and more particularly the type embodying an ornamental frame member above the lens rim. Spectacles with detachable ornamental frame members covering and/or extending above the lens rim are well known. These prior devices include such members having temples attached thereto and therefore removable with the ornamental frame member. However, a difficulty has been encountered in connection with these spectacles since the ornamental frame member is not easily detachable. The present invention has for its object to overcome the difficulty mentioned above and to provide an ornamental frame member that can be easily attached and detached from the lens rim of the spectacles.

Other objects and advantages of the invention will appear as this description proceeds.

In its preferred form the invention embodies an ornamental frame member having a temple secured thereto, which frame member has a recess adjacent the temple for receiving a projection on the temple end of the lens rim. This enables the ornamental frame member to be positioned with said recess surrounding the projection and then the ornamental frame member may be rotated to its final position on the lens member. The rim for the lens has a leaf spring attached thereto and extending toward the bridge, there being a pin on the free end of the leaf spring. The temple member has an elongated cavity or slot surrounding the leaf spring and extending from the rim upwardly beyond the leaf spring. This slot or cavity is bounded on the rear by a wall, one face of which forms part of the rear side of the ornamental frame member and therefore faces the eyebrow of the person wearing the spectacles. This wall defines a hole for receiving the pin on the free end of the leaf spring and therefore when the frame member is correctly positioned as aforesaid, the said pin engages said hole and holds the ornamental frame member in position. To release the ornamental frame member, all that is necessary is to press the pin inwardly until the leaf spring has been flexed in which event the ornamental frame member is released from the rim and may be readily removed. Other forms of the invention will be described hereinafter.

In the drawing:

FIGURE 1 is a rear view of spectacles embodying one form of the invention, the temples not being shown. This view is one which would appear to the wearer of the glasses if after wearing the same he moved them directly away from his eyes a short distance. Parts of the device are cut away.

FIGURE 1A is a detailed view of a portion of the device of FIGURE 1.

FIGURE 2 is a top view of the spectacles with the left-hand ornamental frame member installed and the righthand one omitted.

FIGURE 3 is a top view of the ornamental member that is adapted to fit onto, but is not installed on, the device of FIGURE 2.

FIGURE 4 is a cross sectional view of the device.

FIGURE 5 shows enlarged cutaway rear view of the ornamental frame member shown in FIGURE 4.

FIGURE 5A is a cross sectional view of FIGURE 5 taken along line 5A—5A.

FIGURE 6 is a cutaway rear view of another form of the invention.

FIGURE 6A is a detailed view of a portion of FIGURE 6.

FIGURE 7 is a cross sectional detailed view of a further modification of the invention.

FIGURE 7A is a detailed view of a portion of the form of device illustrated in FIGURE 7.

FIGURE 8 is a cross-sectional view of a modified form of the device.

FIGURE 9 shows an enlarged cutaway rear view of the ornamental frame member shown in FIGURE 8.

FIGURE 9A is a cross-sectional view of FIGURE 9 taken along line 9A—9A.

In FIGURE 1, the spectacles comprise a lens 10a for the left eye, a lens 10b for the right eye, a rim 11 for the left lens and a rim 12 for the right lens. A bridge 13 permanently connects the two rims 11 and 12. Temples are not directly attached to the rims, in the preferred form of the invention, but are carried by the ornamental frame members 14 and 15 which have suitable provision 16 for connecting the temples thereto. The members 14 and 15 may be ornamented on the front, and several different ornamental frame members 14 and 15, each having different ornamentation, may be supplied with each pair of spectacles. Hence, the wearer of the spectacles may change the ornamentation to suit the particular apparel or jewelry being worn at the time. The invention resides in the means of attaching and detaching the members 14 and 15 to the rims 11 and 12 so that the frame member can be easily replaced. Since the attaching means in connection with both rims 11 and 12 of FIGURE 1 are identical, the description of the righthand one will serve to explain the other. The rim 12 has a projection 17 which fits into a complementary recess 18 in member 15. The first step in installing the frame member 15 on the rim 12 is to place recess 18 about the projection 17 and then rock the member 15 counterclockwise until the left end thereof meets the bridge 13. Located within the members 15 is a slot 19 half of which appears in FIGURE 1A. The slot or cavity 19 is bounded on its top by the member 15 and on its front and rear sides by portions of the wall of member 15. These front and rear walls are shown in more detail in FIGURE 4 where the front wall is designated with reference number 21 and the rear wall designated 20. A leaf spring 22 has one end attached rigidly to the rim 12, the spring extending generally toward the bridge 13 and having a pin 23 at its free end. Pin 23 extends through a hole 24 (see FIGURE 4) in rear wall 20 when the ornamental frame member 14 is correctly installed and positioned on the rim. The bridge 13 has an overhanging portion 13a on each side which acts as a supporting member for the respective leaf spring 22 in that it limits upward motion of the spring in the plane of the lens. In order to remove the ornamental frame member 15 from the rim 12, all that one need do is to press the pin 23 (see FIGURE 4) inwardly and thus press the leaf spring 22 to the alternate position thereof shown by chain lines in FIGURE 4. The ornamental frame member 15 may then be rocked about the projection 17 and readily removed.

The modified form of spectacle of FIGURE 8 embodies a modified form of spring member and receiving slot therefor as more fully shown in FIGURE 9 and FIGURE 9A. In this form of the invention, the spring 22, instead of having a pin on the free end thereof, has an enlargement 30 which fits into a special indent 31 (see FIGURE 9A). A hole 32 is provided through which a sharp instrument may be projected to flex the leaf spring 22 when the ornamental frame member is to be removed.

The form shown in FIGURE 5, and in FIGURE 5A, is simply another showing of the same form of the invention which is shown in FIGURE 1 and in FIGURE 4.

In the modified form of FIGURE 6 the rim 12 has a projection 40 rigidly secured thereto, and the ornamental frame member 15 has a recess 41 which can be placed about the projection 40, whereby the ornamental frame member 15 may be rocked into its final position. Suitable means 16 for attaching temples is provided as in the other figures. The rim 12 has a second projection 42 that receives a recess 43 in member 15 for the purpose of properly locating the member 15. The latter member has another recess 44 that has a shoulder 45 on which the catch or pin 46 carried by the leaf spring 47 may rest when the device is correctly positioned. The leaf spring 47 is rigidly attached at its lower end to the rim 12. The frame member 15 has an inclined surface 48 which when the frame member is rocked into position at first passes to the right of the pin or catch 46; but as the frame member 15 approaches its final position more closely the inclined wall 48 presses against the pin 46 and moves it toward the rim 12 until finally the pin or catch 46 passes above the shoulder 45. It then locks at that point and holds the frame member 15 securely in the desired position.

To release the frame member 15, all that is necessary to do is to project a sharp instrument into the cavity which exists between the leaf spring 47 and the wall 48 and then press the leaf spring 47 toward the rim 12 until the pin 46 is moved away from the shoulder 45. At this time the frame member 15 may be readily removed from the rim 12.

In the modified form of FIGURES 7 and 7A the lens rim 12 and the frame member 15 are the same as in FIGURE 6 so far as the portions adajacent the bridge 13 are concerned; however the portions of these parts adjacent the temple have been modified. The projection 42 on the lens rim and the recess 43 in the member 15 are the same as in FIGURE 6. However, the locking means in this case includes a projection 50 integral with the lens rim 12. Ornamental frame member 15 includes a cavity 51 in which there is a spring member 52 pressing a locking element 53 under the projection 50. The locking element 53 carries a knob or operating handle 54 which extends through the slot 55 in the inner wall of the frame member 15. Element 53 has two guide members 56 for guiding the same in the slot 51. To install the ornamental frame member 15 of FIGURE 7, recess 41 is placed over projection 40 at the left side of the lens rim 12 and the ornamental frame member 15 is then rocked about the projection 40. Eventually the slidable catch or locking element 53 engages the projection 50, and the rounded corners of their mating surfaces cause the element 53 to be retracted. When the frame member 51 is in proper position, the end of the catch 53 is free to slide under the lower edge of projection 50 and it is operated to such position by the restoring force exerted by spring 52. To remove frame member 15 it is only necessary to press knob 54 and thus element 53 to the right so as to clear projection 50. The frame member can then be rocked counterclockwise until the projection disengages from recess 41.

We claim to have invented:

1. In a spectacle, a first lens, a second lens, a rim for the first lens, a rim member for the second lens, a bridge connecting the rim and the rim member, an ornamental detachable frame member mounted on and above the rim member, a temple hingedly attached to said frame member, a projection on one of said members and a cooperating recess in the other both adjacent the temple to limit upward movement of the temple end of the frame member, a leaf spring having one end mounted on and above said rim member and flexing in a plane generally parallel to the line of sight, said leaf spring extending in said plane from its point of attachment to the rim in a direction toward the bridge, said frame member having a slot therein for receiving said spring, said slot extending in said plane from the lower part of the frame member upward beyond the leaf spring and being both longer and wider than the leaf spring, said slot being bounded on the front by a front wall the outer face of which forms at least part of the front face of the frame member and on the rear by a rear wall the outer face of which forms at least part of the rear face of the frame member, said rear wall having an opening therein adjacent the free end of said leaf spring, and a projection on the leaf spring extending into said opening to lock the frame member to the rim member but which can be pressed inward to flex the leaf spring and release the locking engagement effected by said second projection and thereby permit the frame member to be disengaged from the rim member.

2. In a spectacle, a first lens, a second lens, a rim for the first lens, a rim member for the second lens, a bridge connecting the rim and rim member, an ornamental frame member detachably mounted on said rim member, a leaf spring having one end thereof secured to the rim member and flexing substantially only in the direction of sight through said lenses, said frame member defining a slot therein extending away from the rim member for a limited distance and being larger than and surrounding said leaf spring, and locking means cooperating with the free end of the leaf spring and the frame member for securing the two together and for releasing the same upon application of flexing pressure to the leaf spring.

3. In a spectacle, a first lens, a second lens, a rim for the first lens, a rim member for the second lens, a bridge connecting said rim to said rim member, a frame member detachably mounted on said rim member, a leaf spring having one end attached to the rim member and flexing substantially only in a direction generally parallel to the axis of said lenses, said frame member defining a cavity having its opening at the rim member and extending outwardly therefrom and surrounding the leaf spring, and locking means on the free end of the leaf spring cooperating with a side wall of the cavity to releasably lock the frame member on the rim member.

4. In a spectacle, a first lens, a second lens, a rim for the first lens, a rim member for the second lens, a bridge connecting said rim to said rim member, a frame member detachably mounted on said rim member, a leaf spring extending away from and having one end attached to the rim member, a catch element mounted on the free end of the leaf spring, said frame member defining a cavity surrounding the leaf spring and enclosing the same and including a wall defining an opening into which the catch element snaps under the force of said spring when the frame member is positioned on the rim member, said leaf spring flexing substantially only in the direction of sight through said lenses, said cavity and said opening adjoining each other to form a single continuous space which includes an entranceway through which may be applied force to flex the leaf spring and release the catch element.

5. In a spectacle as defined by claim 4, said leaf spring being on top of the rim member and located in a plane that is perpendicular to the line of sight, said frame member having a wall between the cavity and the eyebrow when the spectacle is in use which wall defines a hole therethrough for receiving said catch element and enables the catch element to be released and therefore constitutes said opening as well as said entranceway.

6. In a spectacle, a first lens, a second lens, a rim for the first lens, a rim member for the second lens, a nose bridge connecting said rim to said rim member, an ornamental frame member for said rim member, a temple secured to said frame member, holding means for holding the frame member to and above the rim member at two places respectively adjacent opposite ends of the frame member, the holding means at one of said places having a projection on and a cooperating recess in said members respectively, said holding means including at the other of said locations a restraining element fixed to one of said members and resilient locking means on the other member which when in the position it normally assumes engages the restraining element to hold the members together and which can be pressed away from the restraining element to enable separation of the members, said frame member having an opening in a part thereof adjacent said rim member for enabling the resilient locking means to be pressed away from the restraining element, said locking means comprising a leaf spring attached at its lower end to the rim element at a level above that of the bridge, said leaf spring flexing in a direction generally parallel to the axis of said lenses and having a projection at its upper free end extending generally parallel to said axis, said restraining element being part of the frame member and including means extending below said projection when said spring is in its normal position to thereby restrain upward movement of the frame member until the leaf spring is flexed out of its normal position to disengage said last-named means, and means being part of said bridge for limiting motion of said leaf spring in the plane of each lens.

7. In a spectacle having at least one lens mounted in a rim member, a substantially rigid frame member adapted to fit over the top edge of said rim member, holding means for detachably securing said frame member to said rim member at at least two spaced locations, said holding means at a first of said locations comprising an element on said frame member fitting under a cooperative projection on said rim member, said element and said projection being so formed as to permit at least limited rotation of said members relative to each other about said first location with respect to the relative position wherein said members are secured at both said locations, said holding means at said second location comprising a latching means on one of said members coming into latching engagement with a restraining element on the other of said members when said members are first secured at said first location and thereafter rotated toward each other with the bottom portion of said frame member in contact with the upper edge of said rim member at said second location, means for positioning said latching means normally in latching engagement with said restraining element but permitting movement of said latching means out of said latching engagement when said members are to be separated, said restraining element on said other member being so positioned thereon as to be interposed in the path of said latching means while in its normal position and upon rotatable separation of said members about said first location, said latching means being movable substantially only in a direction which is generally normal to the direction of travel of said latching means upon said rotatable separation of said members, said element and said cooperating projection at said first location being adjacent to the temple end of the frame member, said frame member having a side wall facing the eyebrow when the spectacle is in use, said opening being in said side wall adjacent the bridge end thereof, said latching means comprising a leaf spring secured at one end to said rim member and extending toward the bridge end of said frame member and having a projection on the free end thereof extending toward the user's eyebrow, said leaf spring being positioned and biased to move said projection into said opening when the frame member is correctly positioned on said rim member, the part of the frame member surrounding said opening constituting said restraining element.

8. In a spectacle having at least one lens mounted in a rim member, a substantially rigid frame member adapted to fit over the top edge of said rim member, holding means for detachably securing said frame member to said rim member at at least two spaced locations, said holding means at a first of said locations comprising an element on said frame member fitting under a cooperating projection on said rim member, said element and said projection being so formed as to permit at least limited rotation of said members relative to each other about said first location with respect to the relative position wherein said members are secured at both said locations, said holding means at said second location comprising a latching means on one of said members coming into latching engagement with a restraining element on the other of said members when said members are first secured at said first location and thereafter rotated toward each other with the bottom portion of said frame member in contact with the upper edge of said rim member at said second location, means for positioning said latching means normally in latching engagement with said restraining element but permitting movement of said latching means out of said latching engagement when said members are to be separated, said restraining element on said other member being so positioned thereon as to be interposed in the path of said latching means while in its normal position and upon rotatable separation of said members about said first location, said latching means being movable substantially only in a direction which is generally normal to the direction of travel of said latching means upon said rotatable separation of said members, said latching means comprising a leaf spring attachment at its lower end to the rim element at a level about that of the bridge, said leaf spring flexing in a direction generally parallel to the axis of said lens and having a projection at its upper free end extending generally parallel to said axis, said restraining element being part of the frame member and including means extending below said projection when said spring is in its normal position to thereby restrain upward movement of the said frame member until the leaf spring is flexed out of its normal position to disengage said last-named means.

References Cited in the file of this patent

UNITED STATES PATENTS

| 2,482,195 | Martin | Sept. 20, 1949 |
| 2,703,036 | Splaine | Mar. 1, 1955 |
| 2,777,361 | Stegeman | Jan. 15, 1957 |
| 2,952,187 | Neary | Sept. 13, 1960 |

FOREIGN PATENTS

| 67,169 | Germany | Feb. 16, 1893 |